(12) United States Patent
Rhodes

(10) Patent No.: US 6,678,903 B1
(45) Date of Patent: Jan. 20, 2004

(54) SPRAY SUPPORT QUICK-INSTALL NUT

(75) Inventor: Stephen Miles Rhodes, Mustang, OK (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 10/338,446

(22) Filed: Jan. 8, 2003

(51) Int. Cl.[7] ............................................... E03C 1/042
(52) U.S. Cl. .......................... 4/695; 4/696; 137/359; 411/329
(58) Field of Search ..................... 4/695, 696, 675–678, 4/567, 568, 515, 517; 137/801, 359, 360; 411/422, 435, 437, 329, 331, 332; 285/206, 158; 403/408.1, 373

(56) References Cited

U.S. PATENT DOCUMENTS

| | | | | |
|---|---|---|---|---|
| 4,435,111 A | * | 3/1984 | Mizusawa | ................... 411/437 |
| 4,826,379 A | * | 5/1989 | Norden | ........................ 411/437 |
| 5,275,199 A | * | 1/1994 | Howell | ........................ 137/360 |
| 5,687,952 A | * | 11/1997 | Arnold et al. | ........... 251/335.3 |
| 6,018,828 A | * | 2/2000 | Loschelder | ..................... 4/695 |

* cited by examiner

Primary Examiner—Gregory Huson
Assistant Examiner—Huyen Le
(74) Attorney, Agent, or Firm—Carlson, Gaskey & Olds

(57) ABSTRACT

A spray handle support assembly includes a support sleeve with outer threads and a support collar. An installation nut that includes inner threads engages the outer threads of the support sleeve. The inner threads of the installation nut include a ramped surface that allows for the inner threads to ride over the outer threads of the support sleeve. The installation nut is then able to pull upward over the support sleeve to engage a bottom surface of the installation deck. Support sleeve includes a flange in a trim collar that engages an upper surface of the deck. The installation nut is pulled upward to engage the bottom surface of the deck and secure the support sleeve in place.

24 Claims, 4 Drawing Sheets

US 6,678,903 B1

SPRAY SUPPORT QUICK-INSTALL NUT

BACKGROUND OF THE INVENTION

This invention generally relates to a spray handle support mount and specifically to a quick install nut for securing a spray handle support mount.

In many sink and faucet applications, a spray handle is used separate from the faucet itself. The spray handle is attached to a hose that extends through the deck or sink surface and is removable to spray items within the sink. In configurations having separate spray handles, a support is mounted within the opening of the deck through which the hose extends. This spray handle support mount is typically installed with a support sleeve and trim ring that is inserted through the opening of the deck and secured by a nut attached from underside of the deck. As appreciated, installation of faucets and spray handles are often accomplished and performed by plumbing professionals. In many applications, plumbing professionals install the spray handle and faucets in new buildings and homes. Typically, many identical spray handle mounts are installed in for a common job or project. Quicker and easier installations reduce costs and improve cost efficiencies.

Accordingly, it is desirable to develop and design a spray handle support that is quick and easy to install.

SUMMARY OF THE INVENTION

In general, terms this invention is a spray handle support including a quick install nut to allow installation from one side of a sink deck or counter top.

A support sleeve having threads disposed about an outer surface is engaged to inner threads of a quick install nut. The inner threads of the quick install nut include a ramp surface and a locking surface. The quick install nut is slid over the outer surface of the support sleeve to engage the outer threads. The quick install nut includes extending fingers that engage a bottom surface of the deck. During installation the quick install nut is installed onto the support sleeve and the entire assembly inserted through an opening in the deck. The fingers of the nut are flexible and compress inwardly to allow insertion of the assembly through the opening of the deck. After the assembly has been inserted through the deck, the fingers will extend outward from the support sleeve in such a manner as to prevent the support sleeve from being pulled back through the opening of the deck. The quick install nut includes a installation tab that extends upward through the support sleeve. The installation tab is pulled firmly upwardly to ratchet the nut upward against the lower or bottom surface of the deck. The fingers engage the bottom surface of the deck and are pulled to provide a tension against the support sleeve and the upper surface of the deck. The ramped thread configuration of the inner threads allows the nut to be pulled upwardly on the outer threads of this support sleeve. The fingers of the nut engage the bottom surface of the deck and hold the support sleeve in place within the opening. The installation tab is then removed to complete assembly of the spray support.

Accordingly, the spray handle support assembly of this invention provides quick and easy assembly through a top surface of the deck that allows for quicker installation without the need for working under the deck during installation of the spray support.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
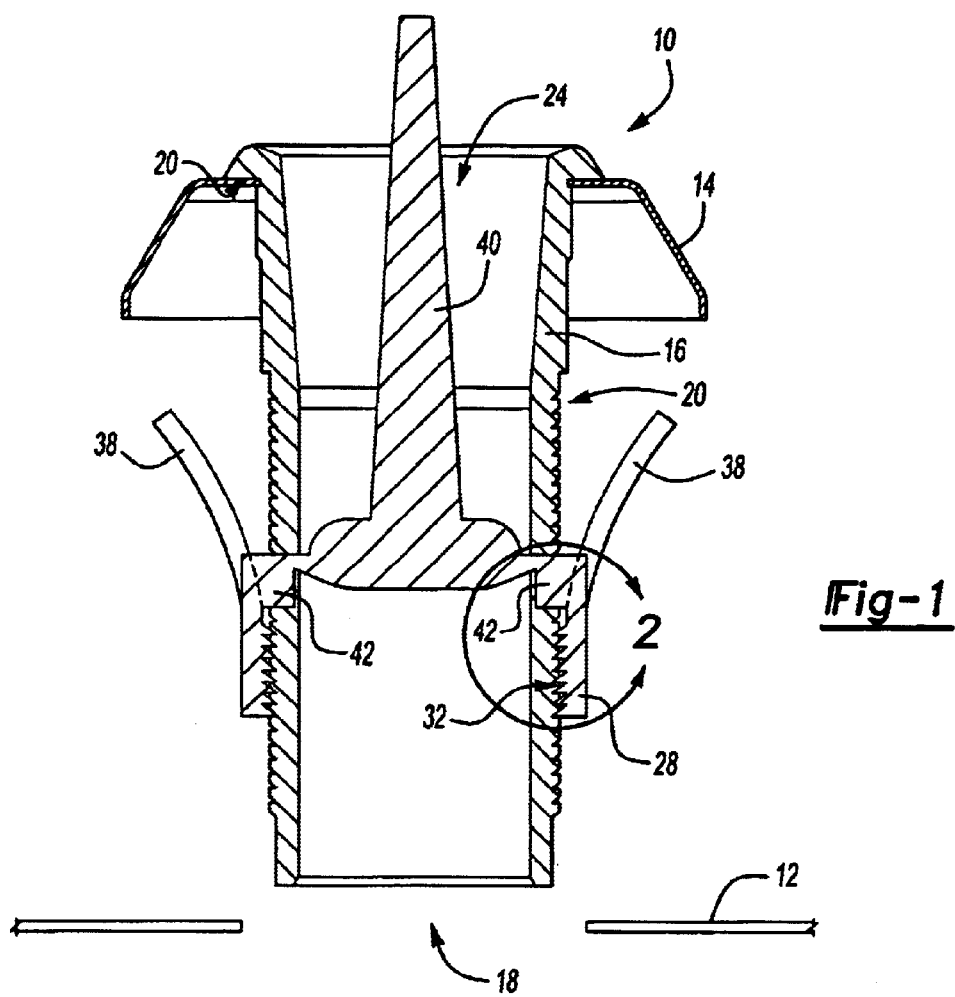
FIG. 1 is a cross-sectional view of the spray support assembly of this invention.
Figure 2:
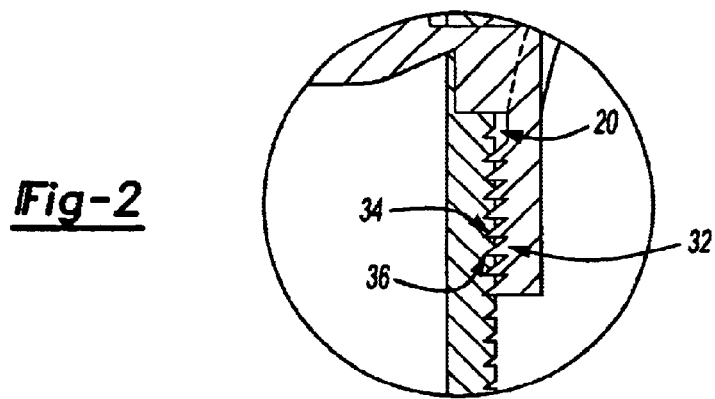
FIG. 2 is an enlarged view of the threads of the spray support sleeve and the quick install nut.
Figure 3:
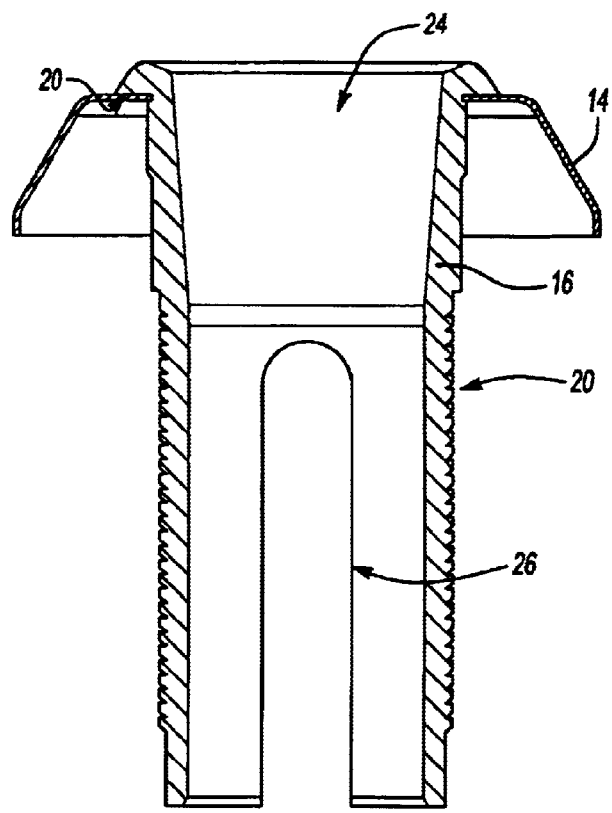
FIG. 3 is a cross-sectional view of the support sleeve and trim ring.

Referring to FIG. 1, a spray support assembly is generally shown at 10 and includes a trim ring 14. The trim ring 14 is slid onto a support sleeve 16. The support sleeve 16 and trim ring 14 are installed into a deck 12. The deck 12 refers to any surface into which the spray support assembly 10 is to be installed. As is appreciated, the spray support 10 may be installed within an opening 18 in a sink fixture or may also be installed in some applications directly through a countertop. It is within the contemplation of this invention that any install configuration as is known by a worker in the art would benefit from this invention.

The spray support assembly 10 is installed within an opening 18 of a deck 12. The spray support assembly 10 includes the quick install nut 28. The nut 28 includes a plurality of inner threads 32. The inner threads 32 comprise a series of teeth 32 having a ramped surface 34 and a locking surface 36. The teeth 32 engage threads 20 of the support sleeve 16. The ramped surface 34 of the inner teeth 32 allow the nut 28 to be slid upwardly along the support sleeve 16. The locking surface 36 prevents the nut 28 from being pulled downwardly along the support sleeve 16. The nut 28 also includes an installation tab 40. The installation tab 40 extends upward through a bore 24 of the support sleeve 16 and is grasped to pull the nut 28 upwardly during installation.

The nut 28 includes alignment tabs 42 that correspond to a slot 26 of the sleeve 16. The slot 26 allows the sleeve 16 to compress slightly during installation of the nut 28. The sleeve 16 also includes a flange portion 20 about an upper surface or entrance of the bore 24. This upper flange portion 24 engages the trim ring 14. As appreciated, the trim ring 14 may be of any material or type as is known by a worker skilled in the art. It is within the contemplation of this invention that trim rings of various materials and appearances can be used depending on the specific application and the aesthetic desires and requirements of the specific fixture.

Figure 4:
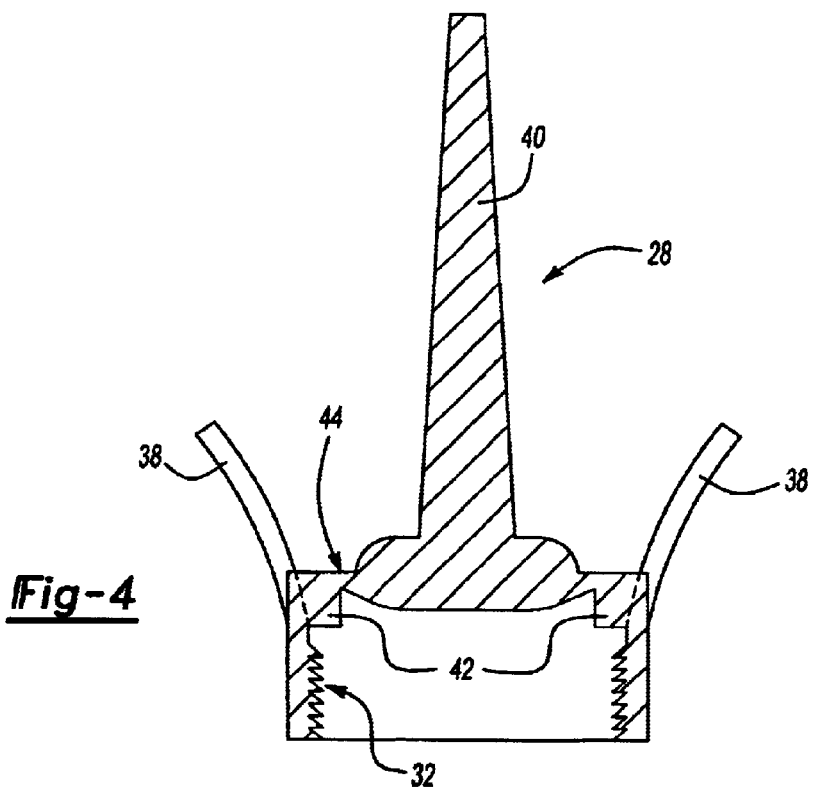
FIG. 4 is a cross-sectional view of the quick install nut.

Referring to FIG. 4, the nut 28 includes the installation tab 40. The installation tab 40 is attached to the nut 28 by way of alignment tabs 42. The installation tab 40 and alignment tabs 42 are attached at a frangible connection 44. Although the specific material and configuration of the nut 28 may be any type of material as is known to a worker skilled in the art, it is preferable that the nut 28 be composed of a plastic material. As appreciated in most plastic injected parts a strew or runner is used to communicate molten plastic material to the cavity that forms the specific shape and configuration of the completed part. In this invention, the alignment tabs 42 and installation tab 40 are part of the sprue. The sprue and gating provide molten plastic to form the nut 28. The nut 28 is designed such that the sprue is an installation tool and part of the completed part. As appreciated, in most plastic injection molding applications, the sprues, gates and runners are excess and disposed of or reground for reuse at a later time. The assembly 10 of this invention uses the sprue as an installation and alignment tool.

Figure 5:
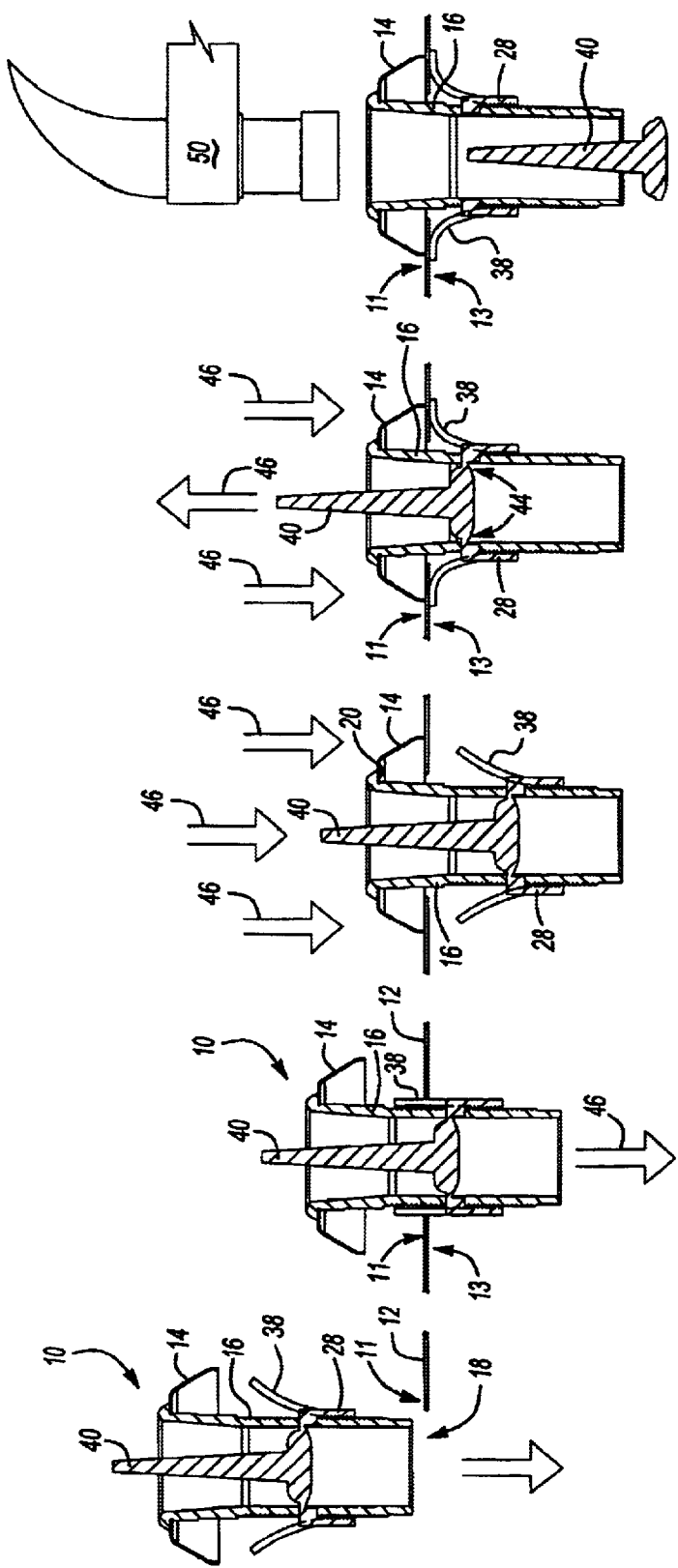
FIGS. 5A–5E illustrate the method of installing the spray support assembly within an opening of a deck.

An embodiment of this invention is a method of installing the spray support assembly 10 and is shown sequentially in FIGS. 5A–5E. Referring to FIG. 5A, support assembly 10 comes assembled with the nut 28 installed onto the sleeve 16. The nut 28 is slid to an intermediate or starting position along the support sleeve 16. In this position, there is a substantial gap between the bottom surface of the trim ring 14 and the upper surfaces of the fingers 38 of the nut. The installation tab 40 extends from the bore 24 of the support sleeve 16. The deck 12 includes the upper surface 11 and the lower or bottom surface 13. The opening 18 is size compatible with the spray support assembly 10. The meaning of size compatible with the spray support 10 is that the outer diameter or surface of the nut 28 is capable of fitting through the opening 18. As appreciated, the specific diameter or size of the spray support 10 will vary according to application specific requirements. In this first step, the assembly 10 is first inserted into the opening 18.

Referring to FIG. 5B, the wings or fingers 38 of the nut 28 are compressed inwardly toward the support sleeve 16 as it is forced through the opening 18 in the deck 12. The fingers 38 are formed such that the natural position is extended outwardly from the support sleeve 16. A downward force on the entire assembly 10 as is indicated at 46 through the opening 18 compresses the fingers 38 inwardly to allow installation and movement of the entire assembly 10 through the opening 18.

Referring to FIG. 5C, the entire assembly is pushed downwardly as is indicated by the arrows 46 until the trim ring 14 contacts the upper surface 11 of the deck 12. In this position, the nut 28 is free of the bottom surface of the deck 12. The fingers 38 have sprung back into a position extending outwardly of the nut 28 such that the nut 28 may not be removed back through the opening 18.

Referring to FIG. 5D, the installation tab 40 is grasped and pulled upwardly as indicated by the arrow 48 while a downward pressure is maintained as is indicated at arrows 46 against the trim ring 14 and support sleeve 16. This movement causes the nut 28 to move upwardly relative to the support sleeve 16 and ratchet along the outer teeth 20 of the support sleeve. The configuration of the installation nut teeth 32 engaged in a ratcheting manner the outer threads 20 of the support sleeve 16. The installation tab 40 is pulled upwardly until the fingers 38 have engaged the bottom surface 13 of the deck 12. Further, the installation tab 40 is pulled such that a constant tension caused by the fingers 38 pulling downwardly on the sleeve 16 maintains position of the spray support assembly 10 within the opening 18 of the deck 12. Pulling of the nut 28 over the sleeve 16 can be accomplished by merely grasping the installation tab 40 with by hand or by using a grasping tool such as pliers, vice grips or the like. The specific tension that is applied by the fingers 38 is such that the spray support 10 is maintained and secured within the deck 12.

Referring to FIG. 5E, the final installation step includes the removal of the installation tab 40. As appreciated, the installation tab 40 is attached to the nut 28 by frangible connections 44. The installation tab 40 is removed simply by tapping the top portion with a tool such as a hammer indicated at 50, or by bending and twisting the tab 40 until the frangible connections 44 are broken to release and free the installation tab 40 which then falls freely through the opening to the access area under the deck 12.

As is appreciated, the method of this invention allows for the complete assembly of the spray support to be accomplished from the top surface of the deck 12. Installation from the top surface eliminates the need for an installer to crawl underneath the sink deck 12 to thread a screw onto the support sleeve 16. As appreciated, crawling under a sink through an access opening is difficult and time consuming. The time saving and ease of installation provided by this spray support assembly 10 allows more efficient use of a professional installers time.

Figure 6:
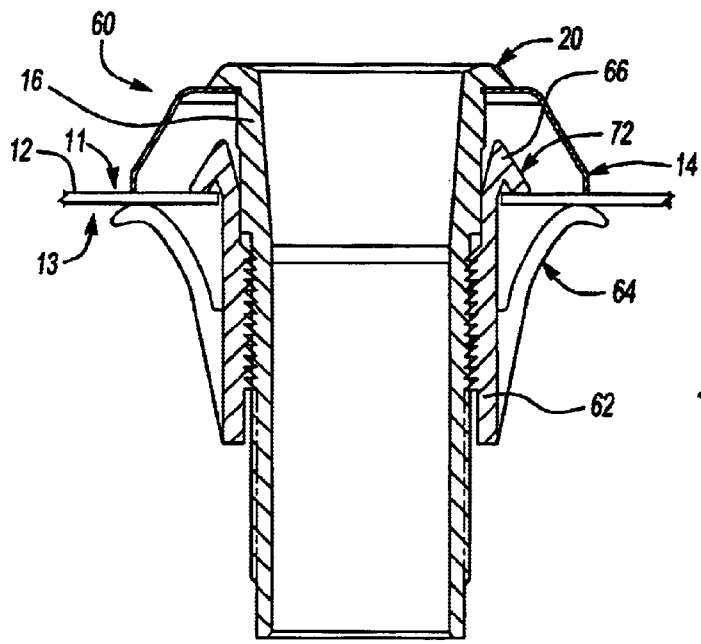
FIG. 6 is a cross-sectional view of another embodiment of this invention.
Figure 7:
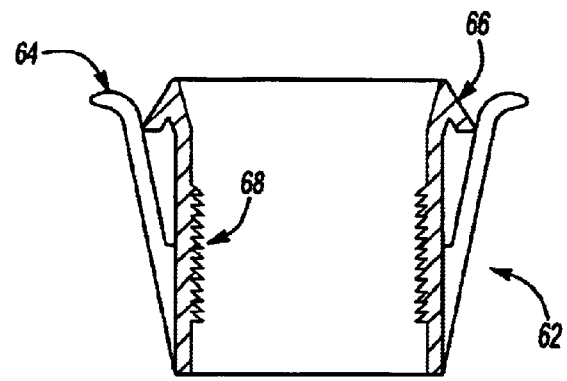
FIG. 7 is a cross-sectional view of a nut of an alternate embodiment of this invention as is shown in FIG. 6.
Figure 8:
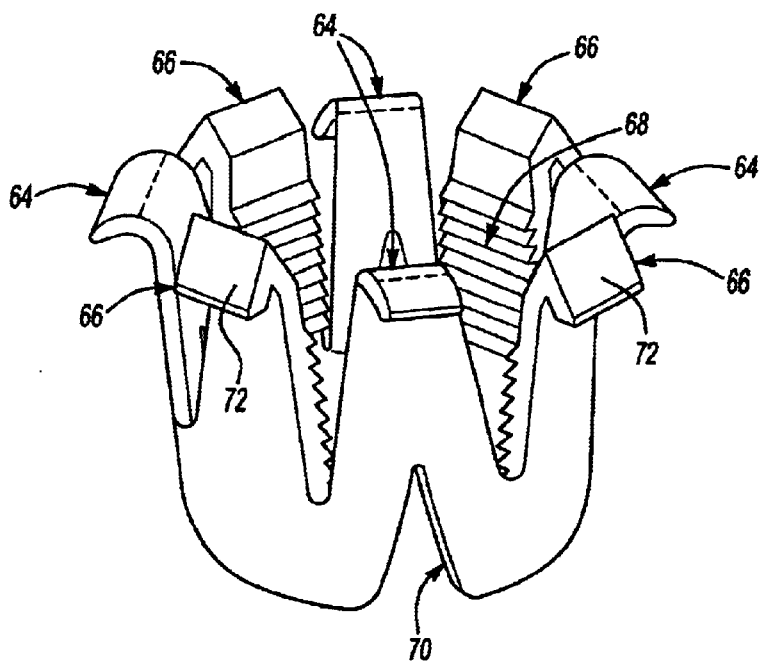
FIG. 8 is a perspective view of the nut of the alternate embodiment of this invention.

Referring to FIGS. 6–8, an alternate embodiment of the spray support is generally shown at 60. It includes a similarly configured trim ring 14 and support sleeve 16. The nut 62 is of a different configuration that does not include the installation tab 40 of the previous embodiment. The nut 62 of this invention is designed for insertion from a bottom side 13 of the deck 12. The installation nut 62 includes the same inner thread configuration 68 as is shown in the previous embodiment. This thread configuration includes a ramped portion 34 and a locking portion 36. The nut 62 of this embodiment includes fingers 64 that are designed to engage the bottom surface 13 of the deck 12.

The nut 62 includes a locking flange 66. The locking flange 66 includes a ramped surface 72. The ramped surface 72 allows the nut 62 to be inserted upwardly from the under side of the deck 13. During installation of this embodiment the nut 62 is first inserted upwardly through the opening 18 in the deck 12 such that the ramped surface 72 causes the fingers of this nut to compress and allow and engage a top surface of the deck 11. Once the nut 62 is installed into the deck 12, the sleeve 16 is then slid into the nut 62 to engage the inner teeth 68.

Referring to FIG. 8, the nut 62 of this embodiment includes a plurality of extending fingers. The fingers alternate between fingers 64 and threaded flange portions 66. The threaded locking flange portions 66 include the ramped surface 72 that extends through the opening in the deck 18 to engage the upper surface of the deck 11. The plurality of fingers or flanges of this nut allow for the compression of the locking flange portion 72 inwardly during insertion through the opening 18. The outer fingers 64 engage the bottom surface of the deck 12 securing the nut 62 in place within the opening 18.

During installation of this embodiment, the nut 62 is first inserted from the bottom of the deck 13 upwardly such that the fingers 64 engage the bottom surface 13 of the deck 12 and the locking flange portions 66 engage a top portion 11 of the deck 12. The support sleeve 66 with the trim ring 14 is then inserted downwardly through the nut 62 to engage the threads 68. This configuration eliminates the need for the installation tab 40. Further, the support sleeve 16 may be removed from the nut 62 by merely and simply threading the sleeve in a direction to unthread the support sleeve 16.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A spray handle support assembly comprising;
   a support sleeve including outer threads and a support collar,
   an installation nut including a portion insertable through an opening in an installation direction and preventing removal of said nut back through said opening in a direction opposite said installation direction and inner threads engaged to said outer threads of said support sleeve, said inner threads including a ramped surface allowing said nut to be pulled over said outer threads in a first direction.

2. The assembly of claim 1, wherein said inner threads include a locking portion preventing said nut from pulling over said threads in a second direction opposite said first direction.

3. The assembly of claim 1, wherein said portion comprises at least one flange extending from an outer surface of said nut for engaging a bottom deck surface.

4. The assembly of claim 1, wherein said portion comprises a plurality of fingers and said inner threads are disposed on said fingers.

5. The assembly of claim 4, wherein said fingers include a flange portion for engagement with a bottom deck surface.

6. The assembly of claim 4, wherein said nut includes at least one expansion slot to allow expansion of said nut as said inner threads are pulled over said outer threads.

7. The assembly of claim 1, wherein said support sleeve includes a slot, and said nut includes tabs that engage said slot and prevent relative rotation between said nut and said support sleeve.

8. The assembly of claim 1, wherein said nut includes an installation tab extending upward from said nut and within said support sleeve.

9. The assembly of claim 8, wherein said installation tab is removable after said nut is pulled into an installed position.

10. The assembly of claim 1, including a trim ring disposed about said support sleeve.

11. The assembly of claim 1, wherein said nut is removable from said support by unthreading said nut.

12. The assembly of claim 1, wherein said nut is installed pulled up over said support sleeve from above the deck.

13. A method of assembling a spray hose support comprising the steps of;
    a. assembling a nut having internal threads with a ramp portion onto a support sleeve having external threads;
    b. inserting said support sleeve and nut through an opening in a deck; and
    c. pulling said nut over said support sleeve until said nut engages a bottom surface of said deck.

14. The method of claim 13, wherein said step c. is further defined by pulling an installation tab extending upward from said nut.

15. The method of claim 14, further including the step of removing said installation tab after said nut engages the bottom surface of the deck.

16. The method of claim 13, further including rotating said nut relative to said sleeve to unthread and remove said nut.

17. The method of claim 13, wherein all of said steps are accomplished from a position above said deck.

18. The method of claim 13, wherein said support sleeve includes a slot and said nut includes a tab, said method including the step of sliding said tab within said slot of said support sleeve to prevent relative rotation between said sleeve and said nut.

19. The method of claim 18, including the step of compressing said tab inwardly to exit said slot of said support sleeve to allow unthreading of said nut from said support sleeve.

20. The method of claim 13, wherein said step c. is further defined as engaging a bottom surface of said deck with outwardly extending flanges disposed on said nut.

21. A spray handle support assembly comprising;
    a support sleeve including outer threads, a support collar and a slot; an installation nut including tabs engageable with said slot that prevent relative rotation between said nut and said support sleeve, and inner threads engaged to said outer threads of said support sleeve, said inner threads including a ramped surface allowing said nut to be pulled over said outer threads in a first direction.

22. A spray handle support assembly comprising;
    a support sleeve including outer threads and a support collar; an installation nut including an installation tab extending upward from said nut and within said support sleeve and inner threads engaged to said outer threads of said support sleeve, said inner threads including a ramped surface allowing said nut to be pulled over said outer threads in a first direction.

23. The assembly of claim 22, wherein said installation tab is removable after said nut is pulled into an installed position.

24. A spray handle support assembly comprising;
    a support sleeve including outer threads and a support collar; an installation nut including a plurality of fingers, said plurality of fingers including a flange portion for engagement with a bottom deck surface and inner threads engaged to said outer threads of said support sleeve, said inner threads including a ramped surface allowing said nut to be pulled over said outer threads in a first direction.

* * * * *